No. 650,308. Patented May 22, 1900.
T. J. DEMOREST.
FOCUSING HOOD FOR CAMERAS.
(Application filed July 13, 1899.)
(No Model.)
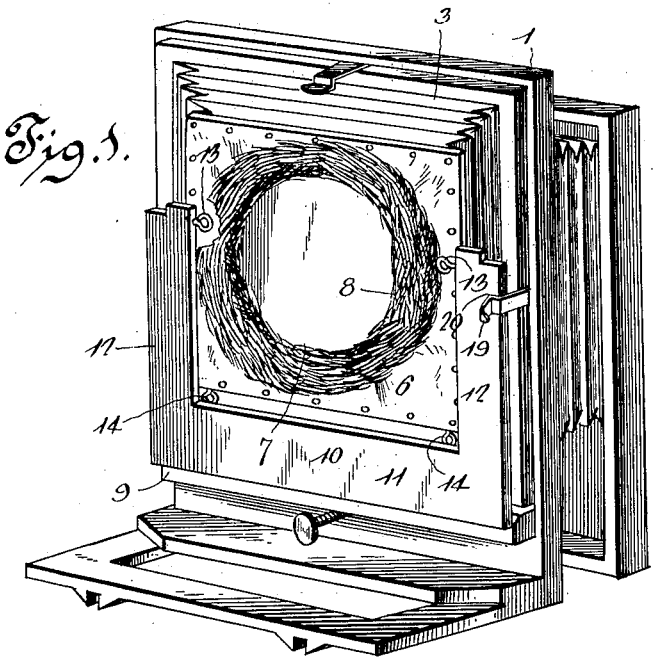
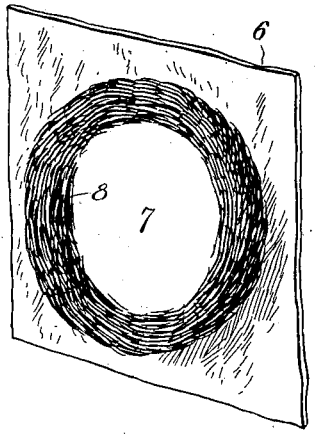
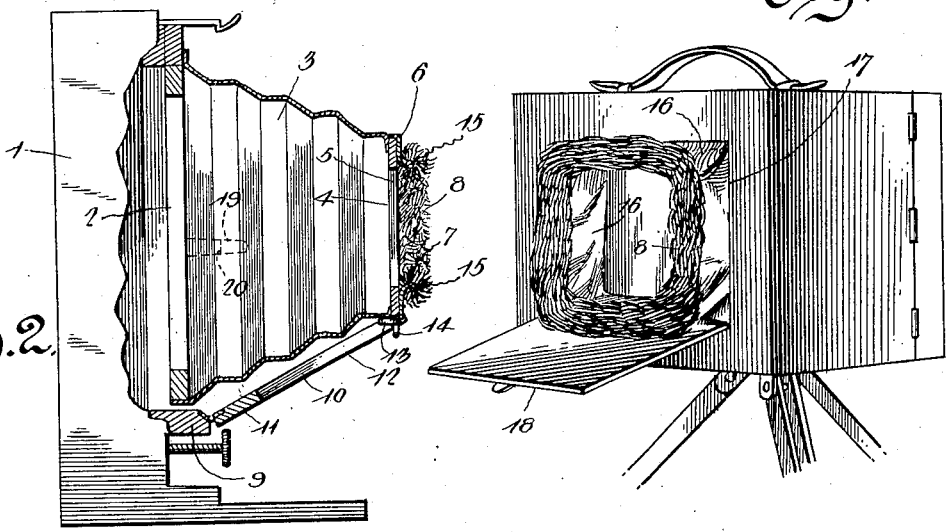
Witnesses
J. Frank Culverwell,
Chas. S. Hyer
Thomas J. Demorest, Inventor.
By his Attorneys,
C. A. Snow & Co.

UNITED STATES PATENT OFFICE.

THOMAS J. DEMOREST, OF GARFIELD, WASHINGTON.

FOCUSING-HOOD FOR CAMERAS.

SPECIFICATION forming part of Letters Patent No. 650,308, dated May 22, 1900.

Application filed July 13, 1899. Serial No. 723,726. (No model.)

*To all whom it may concern:*

Be it known that I, THOMAS J. DEMOREST, a citizen of the United States, residing at Garfield, in the county of Whitman and State of Washington, have invented a new and useful Focusing-Hood for Cameras, of which the following is a specification.

This invention relates to photographic cameras, and particularly to focusing attachments therefor.

The focusing-cloth which is used by photographers and amateurs in photography for the purpose of focusing the picture is ofttimes very inconvenient to handle, inasmuch as both hands are needed for adjusting the cloth over the camera and head of the operator. The use of the focusing-cloth is especially annoying in amateur photography in making outdoor pictures in windy weather, and at a time when great attention is demanded in properly handling and adjusting the focusing-glass.

Many devices have been designed to overcome the defects of the focusing-cloth, but all of the same are more or less ineffective, particularly in failing to obstruct the entrance of light to the interior, and also by reason of a difference in the shape of the heads and faces of operators using the same and a consequent difficulty in obtaining a proper fit without utilizing complex and expensive structural features which will accomplish the desired purpose.

The invention consists in the construction and arrangement of parts which will be more fully hereinafter described and claimed.

In the accompanying drawings, Figure 1 is a perspective view of a photographic camera adapted for portrait purposes and embodying the features of the invention. Fig. 2 is a sectional elevation of the device shown by Fig. 1. Fig. 3 is a detail perspective view of the face cloth or fabric embodying the particular feature of the invention. Fig. 4 is a detail perspective view of an amateur photographic camera, showing the invention applied thereto.

Similar numerals of reference are employed to indicate corresponding parts in the several views.

The numeral 1, Figs. 1 and 2, designates a camera of preferred form and that particular class known as "portrait-cameras," ordinarily used in studios or photographic galleries. This camera comprises, as in ordinary devices of this character, a frame 2, having an object-glass of ground nature, and extending therefrom is a flexible or bellows folding envelope 3, which is reduced rearwardly and attached to a rear frame 4, having an opening 5 therein. Over the frame 4 a flexible covering 6 is secured, which is in like manner supplied with a central opening 7, which coincides with the opening 6, and surrounding said opening 6, on the exterior of the covering 5, is a rim or binding 8, of soft material, preferably animal fur, though at times a wool or analogous material may be substituted, and the intention of the invention is fully satisfied as long as the said rim or binding stands out and affords a receptive or particular inclosure for a portion of the head and the face of an operator.

To a ledge 9, below the object-glass frame, a holder 10 has its front edge movably attached, preferably by means of hinges, and said holder is of substantially U shape or open at the rear, comprising a cross-bar 11, to which the connecting-hinges are attached, and side arms 12. Locking-eyes 13 are affixed to the inner edges of the arms 12 adjacent their free ends, and when the envelop 3 is drawn rearwardly in open condition the frame 4 is of such dimension as to be disposed between the arms 12 of the holder 10, and the lower edge of said frame also has eyes 14 secured thereto near opposite ends and at a different angle to the eyes 13 on the said arms 12.

When the envelop 3 is distended, as shown by Fig. 2, it is maintained in such position by the holder 10 and through the medium of the interlocked eyes 13 and 14. The interlocking of the said eyes is due to the difference in angle, and the shanks of one set come in contact with the shanks of the other set, and the eyes proper bind and prevent separation of the envelop and holder, and thus make the distance of the observer from the object-glass constant, with the attendant advantages well understood in the art.

To make the rim or binding 8 more effective in its sealing engagement with the face and head of the operator, a wire 15 (shown by Fig. 2) is embedded therein or in proximity thereto by securement to the covering 6 around the point of engagement of the said rim or binding with the latter. Through the use of this wire the rim or binding 8 may be shaped or drawn in closely to the head and face of the operator and thoroughly exclude the entrance of light-rays to the envelop.

In Fig. 4 the attachment is shown applied to an amateur photographic camera, and in this instance a central flexible envelop 16 is attached to the interior of the camera in surrounding relation to the object-glass. The free end of the said envelop 16 is provided with a similar rim or binding and may be projected through an opening 17 in the camera-box, which is adapted to be covered by a drop-door 18. When in use, the envelop 16 is distended and the rim or binding is disposed on the drop-door 18, as shown, in convenient position for use.

After the camera has been properly focused and the improved device is not required for further use the envelop and rim or binding may be readily closed into the camera-box. The prominent feature of the invention resides, as will be understood, in the projection of the rim or binding and composed of a material that will closely fall into the contour of the face and head of an operator and bear upon the contiguous portions of itself to intensify the exposure of the object on the object-glass by absolutely avoiding the penetration or admission of any light-rays to the interior of the envelop or focusing-inclosure. This is a material advantage over the use of cameras where it is necessary to employ the common focusing-cloth, or the other band devices that require adjustment and are often then inoperative by reason of failure to fully conform to the irregularity of the head and face of the operator or photographer.

As a means to lock the holder 10 closed when the camera is arranged for storage or other purposes, a spring-arm 19 is attached to the camera-frame adjacent the object-glass frame and has a shoulder 20 to snap over one of the arms 12, and when said arms are brought up they are compressed against the rear frame 4 and hold the envelop 3 in closed position.

The improved attachment may be also applied to other cameras and the dimensions and proportions varied to accommodate different purposes.

Changes in the minor details of construction can also be resorted to without in the least departing from the nature or sacrificing any of the advantages of the invention.

Having thus described the invention, what is claimed as new is—

1. A focusing attachment for photographic cameras, comprising a bellows, a rear frame attached to said bellows and having an opening therein, an outstanding rim or binding of soft material, around the opening in the frame, of an adjustable nature and adapted to retain a fixed shape, and a movably-attached holder for supporting the bellows and the parts thereof in operative position, and also closable against the same when folded.

2. A focusing attachment for photographic cameras, comprising a bellows, a frame connected to the rear of the bellows and having an opening therein, an outstanding rim or binding of soft material around the opening in said frame, eyes attached to the lower portion of the frame, adjacent opposite sides, and a holder having eyes to engage those of the frame, the said eyes of the frame and holder being disposed at different angles.

3. A focusing attachment for photographic cameras, comprising a bellows, a frame connected to the rear of said bellows and having an opening therein, an outstanding rim or binding of soft material around the opening in the bellows, a U-shaped holder movably attached to a portion of the camera and having side arms, and interlocking devices carried by the frame at the rear of the bellows and the said holder.

4. A fixed focusing attachment for photographic cameras, comprising a bellows having an opening in the rear reduced portion thereof, an outstanding rim or binding of soft material around the said opening of an adjustable nature and adapted to retain a fixed shape after adjustment, and a support for holding the bellows when in extended position and movable against the said bellows to hold the latter in closed position.

In testimony that I claim the foregoing as my own I have hereto affixed my signature in the presence of two witnesses.

THOMAS J. DEMOREST.

Witnesses:
J. N. CLARKE,
G. W. NYE.